(12) United States Patent
Wuidart et al.

(10) Patent No.: US 6,547,149 B1
(45) Date of Patent: Apr. 15, 2003

(54) ELECTROMAGNETIC TRANSPONDER OPERATING IN VERY CLOSE COUPLING

(75) Inventors: Luc Wuidart, Pourrieres (FR); Michel Bardouillet, Rousset (FR); Jean-Pierre Enguent, Saint Savournin (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/543,378

(22) Filed: Apr. 5, 2000

(30) Foreign Application Priority Data

Apr. 7, 1999 (FR) .............................. 99 04547

(51) Int. Cl.$^7$ ........................ G06K 15/00; G06K 19/06; G06F 17/60
(52) U.S. Cl. ........................ 235/492; 235/383; 235/385
(58) Field of Search .................. 235/383, 385, 235/492; 340/10.1, 10.2, 10.51, 10.52, 572.3, 572.5; 455/41, 73; 333/174, 175; 342/42

(56) References Cited

U.S. PATENT DOCUMENTS

| | | |
|---|---|---|
| 3,618,089 A | 11/1971 | Moran, Jr. et al. |
| 4,068,232 A | 1/1978 | Meyers et al. |
| 4,278,977 A | 7/1981 | Nossen |
| 4,408,185 A | 10/1983 | Rasmussen |
| 4,656,472 A | 4/1987 | Walton .................. 340/825.34 |
| 4,782,308 A | 11/1988 | Trobec et al. |
| 4,802,080 A | 1/1989 | Bossi et al. |
| 4,814,595 A | 3/1989 | Gilboa |
| 4,963,887 A | 10/1990 | Kawashima et al. |
| 5,013,898 A | 5/1991 | Glasspool |
| 5,126,749 A | 6/1992 | Kaltner |
| 5,142,292 A | 8/1992 | Chang |
| 5,305,008 A | 4/1994 | Turner et al. |
| 5,452,344 A | 9/1995 | Larson |
| 5,493,267 A | 2/1996 | Ahlse et al. |
| 5,504,485 A * | 4/1996 | Landt et al. .................. 342/42 |
| 5,521,602 A | 5/1996 | Carroll et al. |
| 5,541,604 A * | 7/1996 | Meier .......................... 342/42 |
| 5,550,536 A | 8/1996 | Flaxl |
| 5,604,411 A | 2/1997 | Venkitasubrahmanian et al. |
| 5,621,411 A | 4/1997 | Hagl et al. |
| 5,691,605 A | 11/1997 | Xia et al. |
| 5,698,838 A | 12/1997 | Yamaguchi .................. 235/492 |
| 5,703,573 A | 12/1997 | Fujimoto et al. |
| 5,767,503 A | 6/1998 | Gloton |
| 5,801,372 A | 9/1998 | Yamaguchi .................. 235/492 |
| 5,831,257 A | 11/1998 | Yamaguchi .................. 235/492 |
| 5,874,725 A | 2/1999 | Yamaguchi .................. 235/492 |
| 6,025,780 A * | 2/2000 | Bowers et al. ........... 340/572.3 |
| 6,028,503 A | 2/2000 | Preishuberpflugl et al. |

(List continued on next page.)

FOREIGN PATENT DOCUMENTS

| | | |
|---|---|---|
| DE | 28 35 549 A1 | 3/1979 |
| DE | 44 44 984 | 12/1994 |
| DE | 195 46 928 | 6/1997 |

(List continued on next page.)

OTHER PUBLICATIONS

French Search Report from French Patent Application No. 99 09563, filed Jul. 20, 1999.

(List continued on next page.)

Primary Examiner—Karl D. Frech
Assistant Examiner—April Nowlin
(74) Attorney, Agent, or Firm—Wolf, Greenfield & Sacks, P.C.; James H. Morris

(57) ABSTRACT

An electromagnetic transponder of the type including an oscillating circuit upstream of a rectifier adapted to providing a D.C. supply voltage to an electronic circuit, the electronic circuit including circuitry for transmitting digitally coded information, and the transponder including circuitry for detuning the oscillating circuit with respect to a determined frequency, the circuitry for detuning the oscillating circuit being used when the transponder has to transmit information while it is very close to a read/write terminal.

18 Claims, 4 Drawing Sheets

U.S. PATENT DOCUMENTS

| | | | | |
|---|---|---|---|---|
| 6,072,383 A | * | 6/2000 | Gallagher, III et al. | 340/10.2 |
| 6,137,411 A | | 10/2000 | Tyren | |
| 6,208,235 B1 | * | 3/2001 | Trontelj | 340/10.1 |
| 6,229,443 B1 | * | 5/2001 | Roesner | 340/572.1 |
| 6,243,013 B1 | | 6/2001 | Duan et al. | |
| 6,265,962 B1 | | 7/2001 | Black et al. | |

FOREIGN PATENT DOCUMENTS

| | | | |
|---|---|---|---|
| DE | 196 21 076 | 11/1997 | |
| DE | 196 32 282 A1 | 2/1998 | |
| EP | 0 038 877 | 11/1981 | |
| EP | 0 369 622 | 5/1990 | |
| EP | A-0 369 622 | 5/1990 | G06K/7/08 |
| EP | 0 568 067 A1 | 11/1993 | |
| EP | 0 579 332 A1 | 1/1994 | |
| EP | 0 645 840 A | 3/1995 | |
| EP | 0 768 540 | 4/1997 | |
| EP | 0 857 981 A1 | 8/1998 | |
| EP | 0 902 475 A | 3/1999 | |
| FR | 2 114 026 | 6/1972 | |
| FR | 2 746 200 | 9/1997 | |
| FR | 2 757 952 | 7/1998 | |
| GB | 2 298 553 A | 9/1996 | |
| GB | 2 321 726 A1 | 8/1998 | |
| WO | WO93/17482 | 9/1993 | |
| WO | WO98/20363 | 5/1998 | |
| WO | WO99/33017 | 7/1999 | |
| WO | WO99/43096 | 8/1999 | |

OTHER PUBLICATIONS

French Search Report from French Patent Application No. 98 08025, filed Jun. 22, 1998.

French Search Report from French Patent Application No. 99 04547, filed Apr. 7, 1999.

French Search Report from French Patent Application No. 99 04546, filed Apr. 7, 1999.

French Search Report from French Patent Application No. 98 08024, filed Jun. 22, 1998.

French Search Report from French Patent Application No. 99 04548, filed Apr. 7, 1999.

French Search Report from French Patent Application No. 99 04544, filed Apr. 7, 1999.

French Search Report from French Patent Application No. 00/01214, filed Jan. 31, 2000.

French Search Report from French Patent Application No. 99 09564, filed Jul. 20, 1999.

French Search Report from French Patent Application No. 00/06301, filed May 17, 2000.

French Search Report from French Patent Application No. 99 04548, filed Apr. 7, 1999.

French Search Report from French Patent Application No. 99 04545, filed Apr. 7, 1999.

French Search Report from French Patent Application No. 99 07024, filed May 31, 1999.

French Search Report from French Patent Application No. 00 06302, filed May 17, 2000.

French Search Report from French Patent Application No. 00 06065, filed May 12, 2000.

French Search Report from French Patent Application No. 00 06061, filed May 12, 2000.

French Search Report from French Patent Application No. 00 06064, filed May 12, 2000.

French Search Report from French Patent Application No. 00 06071, filed May 12, 2000.

French Search Report from French Patent Application No. 99 04549, filed Apr. 7, 1999.

* cited by examiner

ELECTROMAGNETIC TRANSPONDER OPERATING IN VERY CLOSE COUPLING

BACKGROUND OF THE INVENTION

1. Field of the Invention

The present invention relates to systems using electromagnetic transponders, that is, transceivers (generally mobile) capable of being interrogated in a contactless and wireless manner by a unit (generally fixed), called a read/write terminal. The present invention more to specifically relates to transponders having no independent power supply. Such transponders extract the power supply required by the electronic circuits included therein from the high frequency field radiated by an antenna of the read/write terminal. The present invention applies to such transponders, be they read only transponders, that is, adapted to operating with a terminal only reading the transponder data, or read/write transponders, which contain data that can be modified by the terminal.

2. Discussion of the Related Art

Electromagnetic transponders are based on the use of oscillating circuits including a winding forming an antenna, on the transponder side and on the read/write unit side. These circuits are intended to be coupled by a close magnetic field when the transponder enters the field of the read/write unit. The range of a transponder system, that is, the maximum distance from the terminal at which a transponder is activated (awake) depends, especially, on the size of the transponder antenna, on the excitation frequency of the coil of the oscillating circuit generating the magnetic field, on the intensity of this excitation, and on the transponder power consumption.

FIG. 1 very schematically shows, in a functional way, a conventional example of a data exchange system between a read/write unit 1 (STA) and a transponder 10 (CAR).

Generally, unit 1 is essentially formed of an oscillating circuit formed of an inductance L1 in series with a capacitor C1 and a resistor R1, between an output terminal 2p of an amplifier or antenna coupler 3 (DRIV) and a terminal 2m at a reference potential (generally, the ground). Amplifier 3 receives a high-frequency transmission signal Tx, provided by a modulator 4 (MOD). The modulator receives a reference frequency, for example, from a quartz oscillator 5 and, if necessary, a data signal to be transmitted. In the absence of a data transmission from terminal 1 to transponder 10, signal Tx is used only as a power source to activate the transponder if said transponder enters the field. The data to be transmitted come from an electronic system, generally digital, for example, a microprocessor 6 ($\mu$P).

The connection node of capacitor C1 and inductance L1 forms, in the example shown in FIG. 1, a terminal for sampling a data signal Rx, received from a transponder 10 and intended for a demodulator 7 (DEM). An output of the demodulator communicates (if necessary via a decoder (DEC) 8) the data received from transponder 10 to microprocessor 6 of read/write terminal 1. Demodulator 7 receives, generally from oscillator 5, a clock or reference signal for a phase demodulation. The demodulation may be performed from a signal sampled between capacitor C1 and resistor R1 and not across inductance L1. Microprocessor 6 communicates (bus EXT) with different input/output (keyboard, screen, means of transmission to a provider, etc.) and/or processing circuits. The circuits of the is read/write terminal draw the energy necessary for their operation from a supply circuit 9 (ALIM), connected, for example, to the electric supply system.

On the side of transponder 10, an inductance L2, in parallel with a capacitor C2, forms a parallel oscillating circuit (called a reception resonant circuit) intended for capturing the field generated by series oscillating circuit L1C1 of terminal 1. The resonant circuit (L2, C2) of transponder 10 is tuned on the frequency of the oscillating circuit (L1, C1) of terminal 1.

Terminals 11, 12, of resonant circuit L2C2, which correspond to the terminals of capacitor C2, are connected to two A.C. input terminals of a rectifying bridge 13 formed, for example, of four diodes D1, D2, D3, D4. In the representation of FIG. 1, the anode of diode D1 and the cathode of diode D3 are connected to terminal 11. The anode of diode D2 and the cathode of diode D4 are connected to terminal 12. The cathodes of diodes D1 and D2 form a positive rectified output terminal 14. The anodes of diodes D3 and D4 form a reference terminal 15 of the rectified voltage. A capacitor Ca is connected to rectified output terminals 14, 15 of bridge 13 to store power and smooth the rectified voltage provided by the bridge. It should be noted that the diode bridge may be replaced with a single-halfwave rectifying assembly.

When transponder 10 is in the field of terminal 1, a high frequency voltage is generated across resonant circuit L2C2. This voltage, rectified by bridge 13 and smoothed by capacitor Ca, provides a supply voltage to electronic circuits of the transponder via a voltage regulator 16 (REG). These circuits generally include, essentially, a microprocessor ($\mu$P) 17 (associated with a memory not shown), a demodulator 18 (DEM) of the signals that may be received from terminal 1, and a modulator 19 (MOD) for transmitting information to terminal 1. The transponder is generally synchronized by means of a clock (CLK) extracted, by a block 20, from the high-frequency signal recovered across capacitor C2 before rectification. Most often, all the electronic circuits of transponder 10 are integrated in a same chip.

To transmit the data from transponder 10 to unit 1, modulator 19 controls a stage of modulation (back modulation) of resonant circuit L2C2. This modulation stage is generally formed of an electronic switch (for example, a transistor T) and of a resistor R, in series between terminals 14 and 15. Transistor T is controlled at a so-called sub-carrier frequency (for example, 847.5 kHz), much smaller (generally with a ratio of at least 10) than the frequency of the excitation signal of the oscillating circuit of terminal 1 (for example, 13.56 MHz). When switch T is closed, the oscillating circuit of the transponder is submitted to an additional damping as compared to the load formed of circuits 16, 17, 18, 19 and 20, so that the transponder draws a greater amount of power from the high frequency field. On the side of terminal 1, amplifier 3 maintains the amplitude of the high-frequency excitation signal constant. Accordingly, the power variation of the transponder translates as an amplitude and phase variation of the current through antenna L1. This variation is detected by demodulator 7 of terminal 1, which is either a phase demodulator or an amplitude demodulator. For example, in the case of a phase demodulation, the demodulator detects, in the half-periods of the sub-carrier where switch T of the transponder is closed, a slight phase shift (a few degrees, or even less than one degree) of the carrier of signal Rx with respect to the reference signal. The output of demodulator 7 (generally the output of a band-pass filter centered on the sub-carrier frequency) then provides an image signal of the control signal of switch T that can be decoded (by decoder 8 or directly by microprocessor 6) to restore the binary data.

It should be noted that the terminal does not transmit data while it receives some from a transponder, the data transmission occurring alternately in one direction, then in the other (half-duplex).

FIG. 2 illustrates a conventional example of a data transmission from terminal 1 to a transponder 10. This drawing shows an example of shape of the excitation signal of antenna L1 for a transmission of a code 0101. The modulation currently used is an amplitude modulation with a rate of 106 kbits/s (one bit is transmitted in approximately 9.5 $\mu$s) much smaller than the frequency (for example, 13.56 MHz) of the carrier coming from oscillator 5 (period of approximately 74 ns). The amplitude modulation is performed either in all or nothing or with a modulation ratio (defined as being the difference of the peak amplitudes (a, b) between the two states (0 and 1), divided by the sum of these amplitudes) smaller than one due to the need for supply of transponder 10. In the example of FIG. 2, the carrier at 13.56 MHz is modulated, with a 106-kbit/s rate, in amplitude with a modulation rate tm of, for example, 10%.

FIG. 3 illustrates a conventional example of a data transmission from transponder 10 to terminal 1. This drawing illustrates an example of the shape of control signal $V_T$ of transistor T, provided by modulator 19, and of the corresponding signal Rx received by terminal 1. On the transponder side, the back modulation is generally of resistive type with a carrier (called a sub-carrier) of, for example, 847.5 kHz (period of approximately 1.18 $\mu$s). The back modulation is, for example, based on a BPSK-type (binary phase-shift keying) coding at a rate on the order of 106 kbits/s, much smaller than the sub-carrier frequency. In FIG. 3, signal Rx has been shown as "smoothed", that is, without showing the high frequency carrier (for example, at 13.56 MHz) ripple. In the example of FIG. 3, it has been assumed that each of the three shown bits is different from the preceding bit. Thus, for example, a code 010 is transmitted.

It should be noted that, whatever the type of modulation or back modulation used (for example, amplitude, phase, frequency) and whatever the type of data coding (NRZ, NRZI, Manchester, ASK, BPSK, etc.), this modulation or back modulation is performed digitally, by jumping between two binary levels.

The oscillating circuits of the terminal and of the transponder are generally tuned on the carrier frequency, that is, their resonance frequency is set on the 13.56-MHz frequency. This tuning aims at maximizing the power diffusion to the transponder, generally, a card of credit card size integrating the different transponder components.

As illustrated in FIG. 3, signal $V_T$ is formed of a pulse train at the sub-carrier frequency (for example, 847.5 MHz), a phase shift occurring upon each state change from one bit to the next bit. As concerns the signal recovered on the reader side, it appears not to have a "digital" form, which can make its decoding difficult. Indeed, the shape of signal Rx has, for each bit transmission time (9.4 $\mu$s), a non-linear increase beginning (in capacitance charge) to a maximum approximately at two thirds of the duration of a bit, then an also nonlinear decrease. The enable time, that is, the time taken by signal Rx to reach a level decodable by the demodulator, is linked to the oscillating circuits being tuned. The need for power transfer for the remote supply, associated with the desired system range, requires a high quality factor, and thus that the oscillating circuits be tuned. Now, a high quality factor results in a small pass-band. This results in a limited data flow for the system. Generally, the quality factors are on the order of 10 for the reader and for the transponder.

The transponder may be formed by various objects (key ring, keys, etc.), but is most often, nowadays, in the form of a credit card integrating all the circuits and the antenna or inductance L2. For an information exchange with a reader or a terminal, the card is brought closer to antenna L1 of the reader. The distance between the reader and the card varies and, in some applications, a very close or tight coupling transmission is used, the antennas being distant from each other by less than approximately two centimeters. Such a tight coupling transmission may be used, for example, to enable a payment by means of a transponder, and thus guarantee that only the transponder that is closest to the terminal is recognized by said terminal.

A problem that is raised when the oscillating circuits are very close to each other is that, if they are substantially tuned, the power transmitted from the terminal to the transponder is such that the transponder heats up (antenna L2 is generally formed of one or several planar spirals at the card periphery). This thermal effect results in deforming the plastic card.

SUMMARY OF THE INVENTION

The present invention aims at providing a novel solution that overcomes the disadvantages of conventional solutions when a transponder is in very tight coupling relation with a read/write terminal.

The present invention aims, in particular, at reducing or minimizing the thermal effect linked to the remote supply of the transponder by the read/write terminal.

The present invention also aims at enabling an increase of the data transmission rate when the transponder is very close to the terminal.

The present invention also aims at providing a solution that requires no structural modification of the reader or terminal.

A feature of the present invention is to detune the oscillating circuit of the transponder when it is in very close or tight coupling relation with a read or read/write terminal.

A frequency detuning of an electromagnetic transponder is known from document WO-A-98/29760. This document provides for the antenna of a transponder to be "detuned in frequency or mismatched in impedance, so that the transponder and its electronic circuit absorb less radio field and power. Thus, another transponder located in the vicinity of the mismatched or detuned transponder can receive enough of the radio field to operate properly. The transmission system can then detect or consult this other transponder as if it were alone in the field" of the transmitter. Still according to this document, the mismatch means are used "when the transponder is in an unselected state to limit the power and/or field absorption by the transponder in the unselected state".

The solution advocated by this document amounts to detuning the transponders that are relatively remote from the terminal to maximize the power received by the closest transponder meant to communicate with the terminal. Such a solution does not solve the above-mentioned tight coupling problems. Indeed, the transponder that remains tuned is the selected transponder.

Conversely to this document, the present invention provides a detuned operation in tight coupling. Thus, a feature of the present invention is to provide, for a tight coupling information transmission, a detuned operation of the oscillating circuit of an electromagnetic transponder remotely supplied by a terminal.

The present invention takes account of the fact that the remote supply power recovered on the transponder side is not a monotonic function of the distance that separates the transponder from the terminal.

Indeed, when the oscillating circuits are tuned on the remote supply carrier frequency, if the transponder comes close to a terminal, the remote supply amplitude starts increasing from the system range limit (on the order of some ten centimeters). This amplitude transits through a maximum (critical coupling position) then starts decreasing again when the transponder becomes very close (approximately less than 2 centimeters). For this reason, in particular, it is not provided in conventional systems to make the power of the terminal dependent from the distance at which the transponder is.

The critical coupling position corresponds to the distance at which the coupling between the transponder and the terminal is optimized by a maximum remote supply amplitude received by the transponder when the oscillating circuits of the terminal and of the transponder are both tuned on the remote supply carrier frequency. In other words, the critical coupling frequency corresponds to the distance at which the remote supply power is maximum for a minimum coupling factor, the coupling factor being the ratio of the mutual inductance on the square root of the product of the inductances of the oscillating circuits.

When the oscillating circuit of the transponder is detuned from the remote supply carrier frequency, the power received by the transponder increases as the distance from the terminal decreases, but with a reduced range. In this case, there also is a distance at which the received power is maximum for a given detuning condition. This is an optimal coupling, the critical coupling position being the optimal coupling condition when the two oscillating circuits are tuned on the carrier frequency. It should be noted that the optimal coupling coefficient between the two oscillating circuits depends not only on inductances L1 and L2, on capacitors C1 and C2, and on the frequency (which here is a fixed frequency and corresponds to the carrier frequency), but also on series resistance R1 of the terminal, and on the load of the oscillating circuit of the transponder, that is, on the equivalent resistance of the circuits (microprocessor, etc.) and on the back modulation means (for example, resistor R, FIG. 1), added in parallel on capacitor C2 and on inductance L2. This equivalent resistor will be designated hereafter as R2.

Thus, the contactless and wireless transmission system operates even if one of the oscillating circuits is detuned, provided that the antennas are very close to each other.

More specifically, the present invention provides an electromagnetic transponder of the type including an oscillating circuit upstream of a rectifying means adapted to providing a D.C. supply voltage to an electronic circuit, the electronic circuit including means for transmitting digitally-coded information, and the transponder including means for detuning the oscillating circuit with respect to a determined frequency, the means for detuning the oscillating circuit being used when the transponder has to transmit information while it is very close to a read/write terminal.

According to an embodiment of the present invention, the determined frequency corresponds to the frequency of a carrier for remotely supplying the transponder, coming from the terminal.

According to an embodiment of the present invention, the means for detuning the oscillating circuit are formed of a switched capacitor, in parallel with an inductive element of the circuit, the rectifying means being formed of a one-way conduction element.

According to an embodiment of the present invention, the means for detuning the oscillating circuit are formed of two capacitors respectively associated with each end terminal of an inductive element of the second oscillating circuit, each capacitor being connected in series with a switching means, a reference terminal of which is connected to a reference supply potential of the electronic circuit, downstream of the rectifying means.

According to an embodiment of the present invention, the means for detuning the oscillating circuit are controllable between two positions to enable a selection between an operation of the transponder tuned on the determined frequency, or detuned from this frequency.

According to an embodiment of the present invention, the means for detuning the transponder are also used to detect the distance separating it from a read/write terminal.

According to an embodiment of the present invention, the transponder further includes two resistive modulation means, in parallel on a capacitor for smoothing the rectified voltage provided by the rectifying means, each modulation means being dedicated to one of the tuned or detuned operating modes of the transponder.

The present invention also relates to a system of wireless and contactless data transmission between a terminal of generation of an electromagnetic field and at least one transponder having no independent supply means.

According to an embodiment of the present invention, the data transmission rate from the transponder to the terminal is different according to whether the oscillating circuit of the transponder is or is not tuned to the determined frequency.

According to an embodiment of the present invention, the data transmission rate from the terminal to the transponder is different according to the oscillating circuit of the transponder is or is not tuned to the determined frequency.

The foregoing objects, features and advantages of the present invention, will be discussed in detail in the following non-limiting description of specific embodiments in connection with the accompanying drawings.

DETAILED DESCRIPTION

Figure 1:
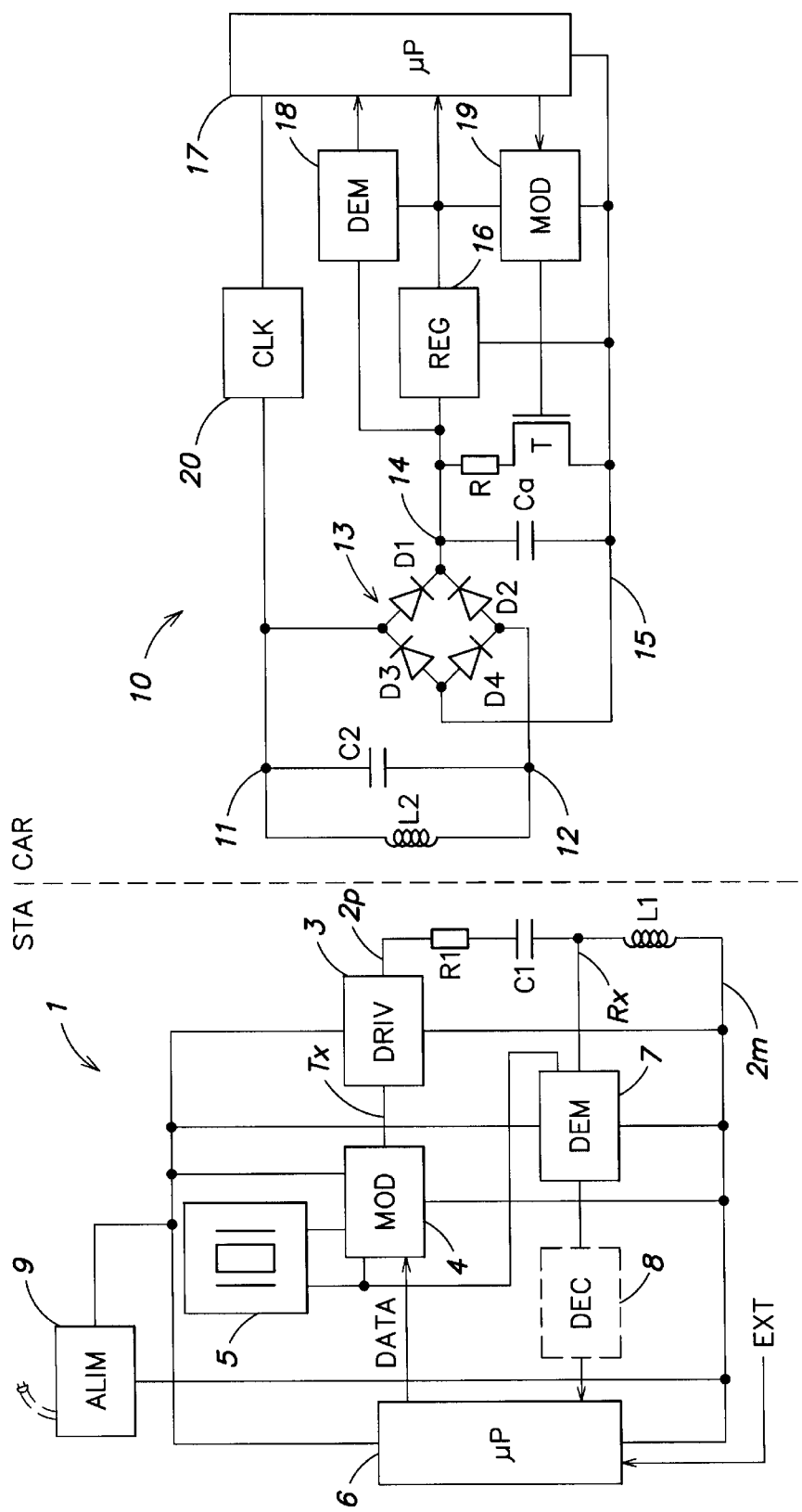
FIGS. 1 to 3, previously described, are meant to show the state of the art and the problem to solve.
Figure 2:
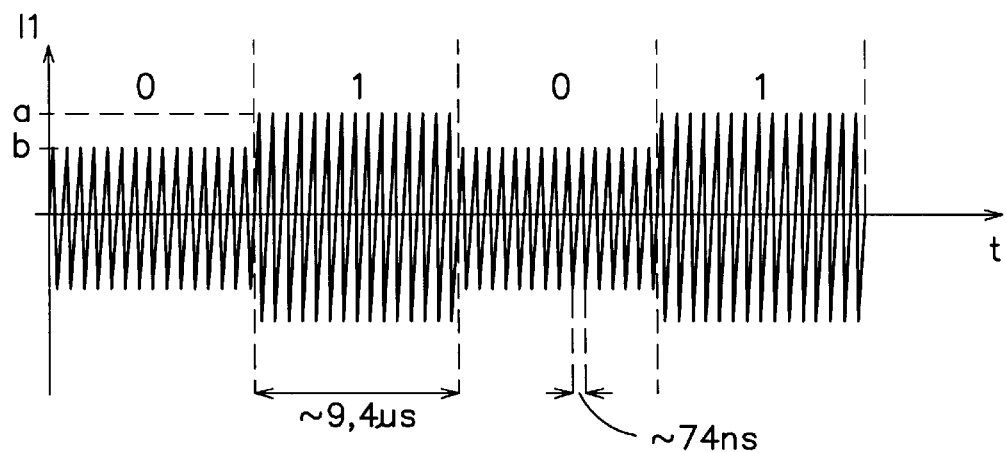

The same elements have been referred to with the same references in the different drawings, and the drawings have been drawn out of scale. For clarity, only those elements necessary to the understanding of the present invention have been shown in the drawings and will be described hereafter.

In particular, the digital electronic circuits have not been detailed, be it on the transponder or reader side.

A feature of the present invention is to provide detuning the oscillating circuit of a transponder when in a situation of tight coupling with a terminal, that is, when their respective antennas are located, for example, at less than 2 centimeters from each other.

The consequence of such a detuning is that the operation resembles that of a transformer, that is, the quality factor is less. Now, in the conventional tuned operation, a quality factor as high as possible is desired, to optimize the power transfer associated with the transponder remote supply.

The fact of detuning the transponder when the coupling is very close has several advantages.

In a detuned operation, the terminal power, that is, the current in the antenna (L1, FIG. 1), may be decreased while transmitting a sufficient power to the card remote supply. Indeed, since the transponder is very close to the terminal, the problem of remote supply range has disappeared. The required power then essentially depends on the transformation ratio (ratio between the number of spirals) of the oscillating circuit inductances. The current decrease required in the antenna suppresses the thermal effect on the transponder side.

Figure 3:
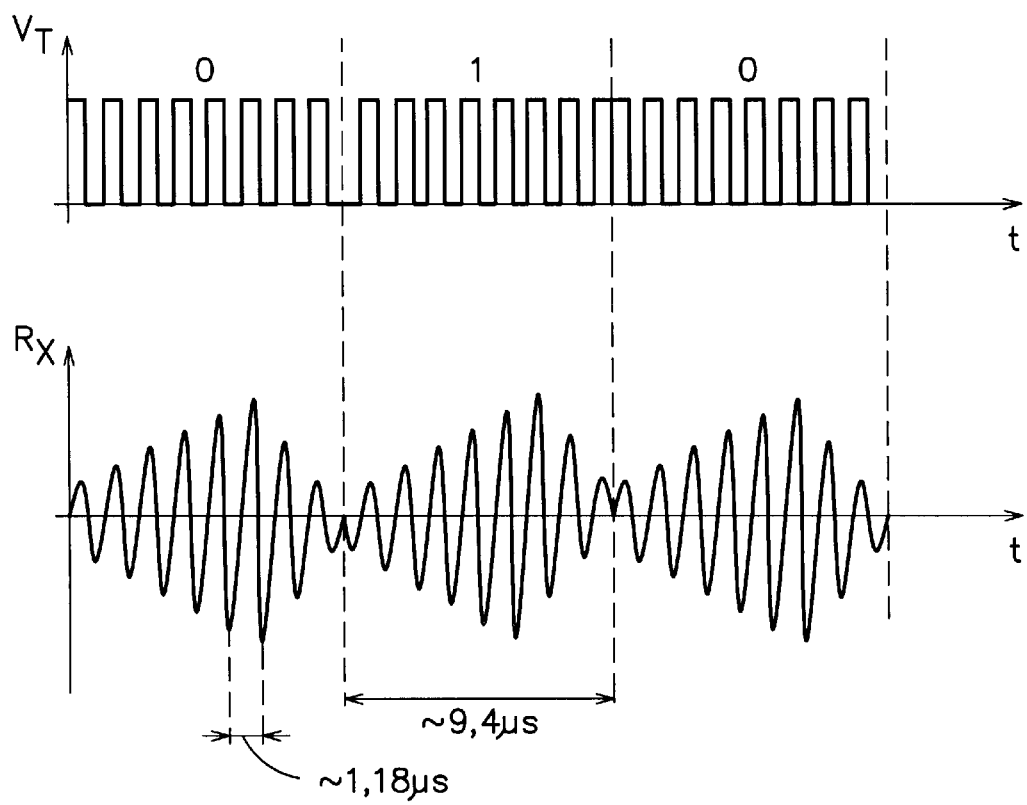
Figure 4:
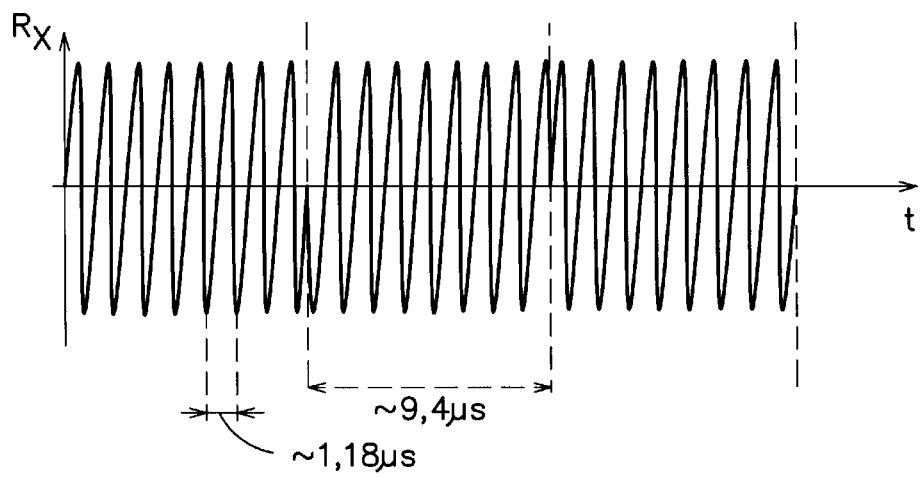
FIG. 4 illustrates, in the form of a timing diagram, an embodiment of the transmission method of the present invention in tight coupling.

FIG. 4 illustrates the shape of signal Rx, on the reader side, after a resistive back modulation on the transponder side, while the oscillating circuit of the terminal is detuned from the remote supply carrier frequency (for example, 13.56 MHz). This drawing is to be compared with FIG. 3. As can be acknowledged, the enable times have almost disappeared. Signal Rx has a shape substantially similar to that of the control signal of the gate of transistor T, on the transponder side. Accordingly, it is now possible to increase the transmission rates since it is no longer necessary to wait, for each transmitted bit, that signal Rx reaches the detection threshold of the phase demodulator of the terminal.

It should be noted that the detuning of the oscillating circuit of the transponder is only desirable in very close or tight coupling. Accordingly, the present invention enables easily dissociating two operating modes of the system according to whether the transponder is or not very close to the reader. It should also be noted that the coupling coefficient is decreased by the detuning of the oscillating circuit. This is not disturbing since the two oscillating circuits are then very close to each other in a transformer type operation.

An advantage of providing a detuning of the oscillating circuit of the transponder is that this requires no material modification of existing read/write terminals. This is particularly advantageous for systems providing a terminal park, a portion at least of which is already installed. Further, if the operating modes in tight coupling and in loose coupling do not need be different, no intervention, not even on the software, is necessary on the terminals. In the opposite case, it is sufficient to reprogram the terminals so that they accept two different operating modes determined by the transponder located in the field and that, for example, transmits an information in this direction to the corresponding terminal.

To detune the transponder's oscillating circuit, a first solution includes connecting, in parallel with the transponder antenna, two capacitors, one of which is connected in series with a switch to make it controllable. This solution includes using, for other purposes, an assembly of the type described in document WO-A-98/29760 that provides a frequency detuning of a transponder by means of a modifiable capacitance in the oscillating circuit.

According to the present invention, for the optimal coupling to correspond to the smallest possible distance between the terminal and the transponder, capacitance C2 has to be increased with respect to its tuned value. This amounts to decreasing the resonance frequency of the transponder's oscillating circuit.

Figure 5:
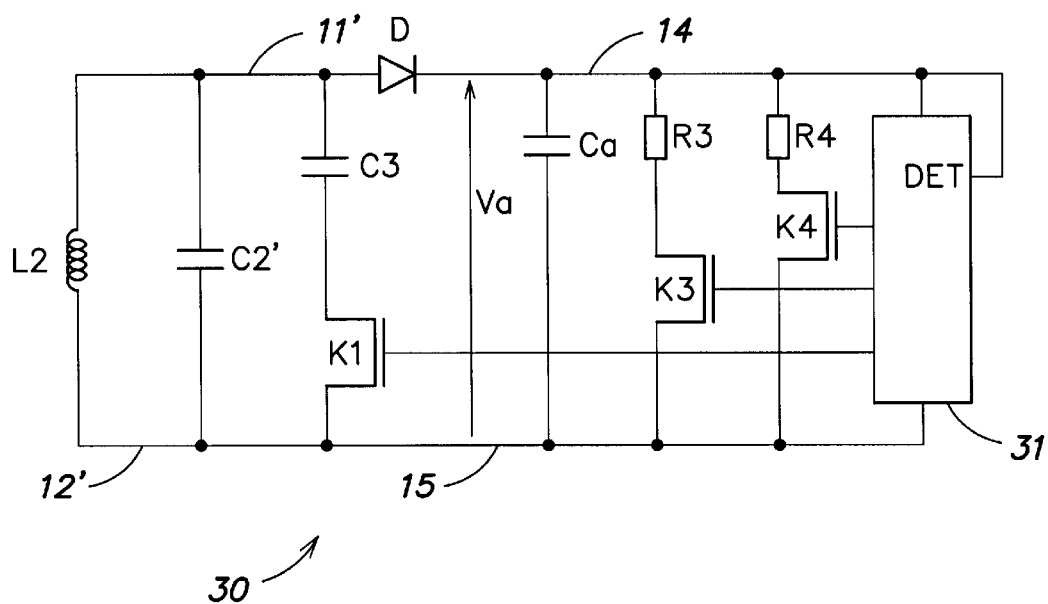
FIG. 5 shows a first embodiment of an electromagnetic transponder according to the present invention provided with means for detuning the transponder's oscillating circuit.

FIG. 5 shows a first embodiment of a transponder 30 according to the present invention. As previously, this transponder is formed from a parallel oscillating circuit including an inductance L2 and a capacitor C2' between two terminals 11', 12' of the circuit.

In the embodiment illustrated in FIG. 5, the rectification performed to extract a D.C. supply voltage Va smoothed by a capacitor Ca is a single-halfwave rectification by means of a diode D, the anode of which is connected to terminal 11' and the cathode of which is connected to positive terminal 14 of capacitor Ca. Voltage reference 15 corresponds to the negative terminal of capacitor Ca directly connected to terminal 12'. Voltage Va is meant for an electronic block 31 including, for example, circuits 16 to 20 of FIG. 1. A capacitor C3 is connected in series with a switch (for example, a MOS transistor) K1 between terminals 11' and 12'. Switch K1 is controlled by circuit 31 by being closed for a tuned operation.

Figure 6:
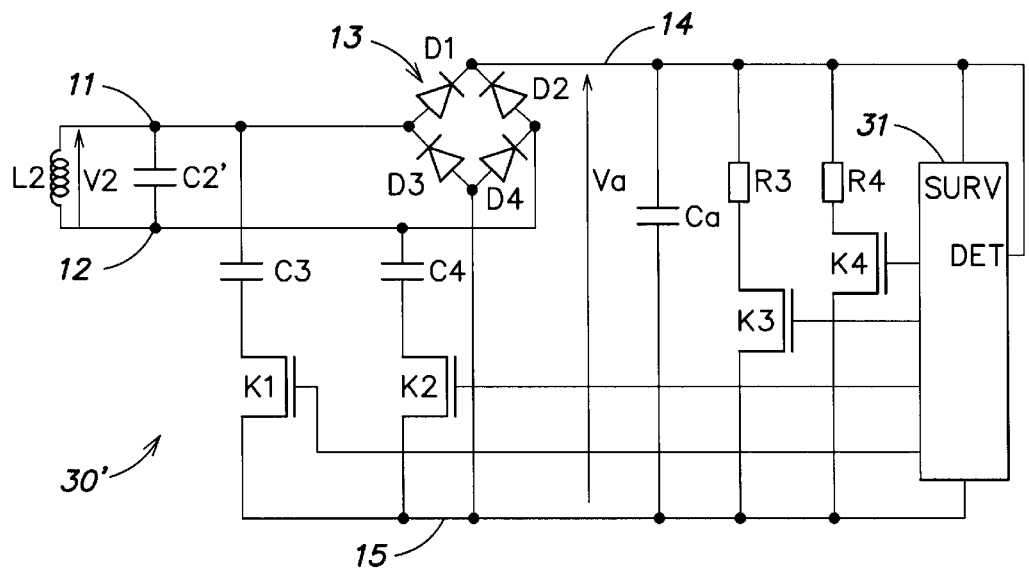
FIG. 6 shows a second embodiment of an electromagnetic transponder according to the present invention provided with means for detuning the transponder's oscillating circuit.

FIG. 6 shows a second embodiment of a transponder 30' according to the present invention. According to this embodiment, terminals 11, 12 of the oscillating circuit are connected to the A.C. input terminals of a bridge 13 formed, for example, of diodes D1 to D4 as in FIG. 1. Two rectified output terminals 14, 15 of bridge 13 provide, via smoothing capacitor Ca, voltage Va of supply of electronic block 31.

According to this embodiment, two capacitors C3 and C4 are respectively connected in series with a switch (for example, a MOS transistor) K1, K2, respectively between terminals 11 and 12 and terminals 15. Thus, a first terminal of capacitor C3 is connected to terminal 11, its second terminal being connected, via transistor K1, to terminal 15. A first terminal of capacitor C4 is connected to terminal 12 while its other terminal is connected, via a transistor K2, to terminal 15. Capacitors C3 and C4 are respectively associated with each sign of high frequency A.C. voltage V2 across antenna L2. Capacitors C3 and C4 are thus of same value. Transistors K1 and K2 are controlled by block 31, preferable from a same signal, to be closed when the circuit has to be tuned on the remote supply carrier frequency.

It should be noted that, due to the doubling of the capacitors, a reference node is available (line 15) for the control of switches K1 and K2. Thus, if switches K1 and K2 are formed of N-channel MOS transistors, it is now possible, by a logic signal coming from block 31, to control these switches in all or nothing, which is not possible with the solution advocated by document WO-A-98/29760.

For example, capacitors C2', C3 and C4 have, each, a capacitance corresponding to half the capacitance (C2, FIG. 1) necessary to tune the oscillating circuit on the reader carrier frequency.

Figure 7:
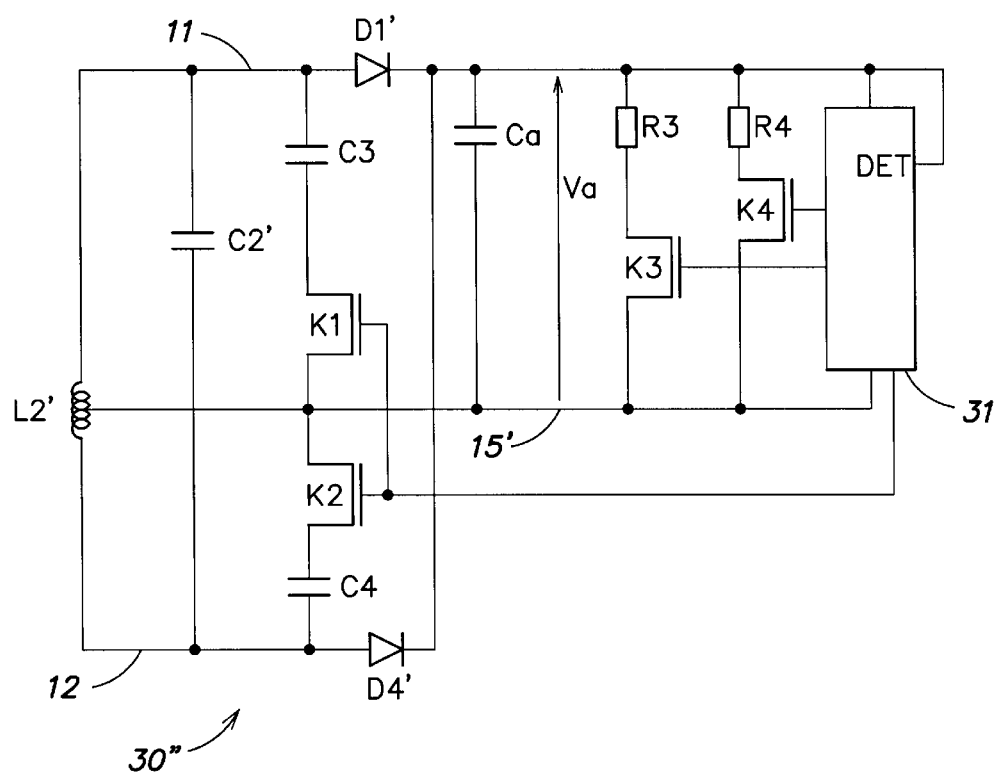
FIG. 7 shows a third embodiment of an electromagnetic transponder according to the present invention provided with means for detuning the transponder's oscillating circuit.

FIG. 7 shows a third embodiment of a transponder 30" according to the present invention. Transponder 30" substantially includes the same components as that of FIG. 6.

A feature of this third embodiment is to provide an inductance L2' with a midpoint. This midpoint is then used as a reference 15' for the D.C. supply of electronic circuits 31 of the transponder. Thus, a first terminal 11 of winding L2' is connected to the anode of a rectifying diode D1', the cathode of which forms positive local supply terminal 14 of the transponder. A second terminal 12 of winding L2' is connected to the anode of a second rectifying diode D4', the cathode of which is connected to terminal 14. As previously, a capacitor Ca is connected between terminal 14 and reference line 15 to smooth the supply voltage of electronic circuits 31. Between each of terminals 11, 12 and reference line 15' is connected a switched capacitor according to the present invention formed, for example as in FIG. 5, of a capacitor C3, C4 in series with a switch K1, K2.

It should be noted that switches K1, K2 may be controlled from a same control signal provided by block 31, as illustrated in FIG. 7, or by distinct control signals (FIG. 6).

In the embodiments of FIGS. 6 and 7, transistors K1 and K2 are preferably on when the oscillating circuit is to be tuned. If, in particular in the circuit of FIG. 7, capacitors C3 and C4 have, each, a value that is twice the value of capacitor C2', the resonance frequency is, when transistors K1 and K2 are off, approximately pushed back to twice the carrier frequency.

A transponder 30 (FIG. 5), 30' (FIG. 6) or 30" (FIG. 7) of the present invention also includes a resistive back modulation circuit formed, preferably, of two resistors R3, R4 respectively in series with a switch K3, K4 between terminals 14 and 15. Resistors R3 and R4 have different values, respectively high and low.

Consider being between the critical coupling and the terminal, resistor R3, which is of high value, is used to perform the back modulation and transistor K1 (or transistors K1 and K2) is turned off. The system then has a detuned operation close to a transformer operation.

Consider being far from the critical coupling position while being further away from the terminal than this position, that is, consider a loose coupling. Transistor K1 (or transistors K1 and K2) is then turned on and the resistive back modulation is performed by means of resistor R4 that is of smaller value. This then is a conventional operating mode.

It should be noted that the present invention, by using a resistance of small value when away from the terminal, optimizes the system range. The ratio between the respective values of resistors R3 and R4 is, for example, included between 4 and 10 (R3 between 0.4 and 5 kiloohms and R4 between 100 and 500 kiloohms) and, preferably, on the order of 6 (for example, approximately 1500 and 250 ohms).

As an alternative, the capacitor(s) used to detune the circuit is (are) also used as back modulation means. In this case, switched resistors R3, K3, and R4, K4 are eliminated and the values of capacitors C2', C3 (and C4 for the embodiment of FIG. 7) are chosen so that the importance of the detuning is compatible with the phase shift to be detected by the terminal in case of a capacitive modulation. The capacitive modulation directly influences the phase of the voltage across inductance L1 of the terminal without acting upon its amplitude. This eases the phase detection by the terminal. It should be noted that the type of back modulation does not modify the coding, that is, the control signal of the back modulation switch(es) at the carrier frequency.

In the sizing of the oscillating circuit capacitors, account will be taken of the rectifying means used and of the value of smoothing capacitor Ca. Indeed, the conduction periods of the diodes of a bridge (FIG. 7) are generally shorter as compared to the remote supply carrier period than the conduction periods of a single-halfwave rectifying diode (FIG. 6). Accordingly, the duty ratio of action of the back modulation means is different according to the type of rectification performed. Now, this duty ratio has an influence, in particular, on the value of equivalent resistance R2, and thus on the coupling coefficient.

To detune the oscillating circuit of the transponder when in very close coupling, an information relative to the distance separating the terminal from the transponder is used. This distance may be determined by the transponder or by the terminal.

On the transponder side, one of the embodiments of FIGS. 5 to 7 may be used. According to the present invention, their respective electronic circuit is provided with an input DET receiving local supply voltage Va. Input DET is associated with a circuit (not shown) for measuring voltage Va and with at least one element for storing this measurement. In a specific example of embodiment, this may be a microprocessor (6, FIG. 1). The storage of the values of the measured voltages is performed either analogically or, preferentially, digitally over several bits, the number of which depends on the desired analysis precision.

According to a preferred embodiment of the present invention, the following measurement cycle is periodically performed when the transponder is in the range of the terminal and, preferably, as soon as the transponder is activated (supplied) by its entering the field of a reader. Transistor K1 (FIG. 5) or transistors K1 and K2 (FIG. 6) are initially on, the oscillating circuit being tuned. The voltage present on terminal DET is measured. Then, transistor(s) K1, K2 is (are) turned off. The circuit is then detuned, its resonance frequency being shifted to, in the case of FIG. 5, more than twice the tuning frequency if capacitors C2' and C3 have the same value. The voltage on terminal DET is stored again. As an alternative, the first measurement is performed with a detuned circuit. The two obtained values are compared and the result of this comparison is stored, for example on a single bit.

It should be noted that the time (for example, on the order of a few hundreds of milliseconds) required to perform the two "tuned" and "detuned" measurements is small as compared to the transponder displacement speed that corresponds, in most applications, to the displacement speed of a hand.

It should also be noted that the duration for which the oscillating circuit is detuned to perform a measurement is, preferably, chosen to be substantially different from the subcarrier half-period, so that this measurement is not interpreted by the terminal as a back modulation. Indeed, the detuning of the transponder oscillating circuit translates as a phase shift in oscillating circuit L1C1 (FIG. 1) of the terminal that, during the distance determination, must not be mistaken for a data transmission.

The above measurement cycle is repeated after a short time interval (for example, on the order of one millisecond) that remains fast as compared to the passing time of a transponder before a terminal (several hundreds of milliseconds).

It should be noted that, in a simplified embodiment, it may be enough to determine, before each beginning of a data transmission from the transponder to the terminal, the position of the transponder with respect to the critical coupling.

The variation of the value of the comparison bit enables knowing whether the transponder is closer or further away from the terminal as compared to the critical coupling position. If the bit indicates a higher level in detuned position than in tuned position, this means that the transponder is very close to the terminal (in tight coupling). In the opposite case, the transponder is either close to the critical coupling, or between the critical coupling position and the system range limit.

As a simplified embodiment, the use of a dedicated distance determination input (DET) may be avoided by using an existing input of the microprocessor (contained in block 31) of the transponder). This conventional input controls the available local supply voltage across capacitor Ca with respect to a predetermined threshold. The microprocessor stores (in the form of a bit) the state of this voltage with respect to the threshold. The bit is conventionally used, for example, for detecting whether the voltage recovered by the oscillating circuit is sufficient for the transponder supply, and thus to activate said transponder when it enters the field of a reader. This function exists, for example, in transponder microprocessors, for example, circuits ST16 and ST19 of STMicroelectronics, and may thus be used with no significant modification of the transponder.

The distance determination with respect to the critical coupling has the advantage that the performed distance determination or area detection (tight coupling or loose coupling) resembles a differential measurement. Indeed, the detection is performed with respect to the critical coupling that depends on the system and on its environment. Only at the critical coupling is the recovered voltage threshold maximum when the circuits are tuned. It is thus not necessary to provide a specific reference or distance threshold. In other words, the distance threshold between the two tuned and detuned operating modes is then self-adaptive.

It should be noted that the present invention requires no (modulation) information transmission from the reader to the transponder or from the transponder to the reader for the distance determination. The transponder of the present invention thus detects its position with no intervention of the reader. The transponder may then, for example, transmit in back modulation a different message according to its position, the nature of this message placing the system in one operating mode or another.

It should also be noted that the data transmission from the transponder to the terminal can always be based on a phase shift keying, be it a tuned or detuned operation. Indeed, the detuning does not change the high frequency carrier frequency (for example, 13.56 MHz) on which the phase shifts are detected at the sub-carrier rate (for example, 847.5 kHz).

Of course, the present invention is likely to have various alterations, modifications, and improvements which will readily occur to those skilled in the art. In particular, the sizing of the different resistive and capacitive elements depend on the application and, especially, on the frequency of the various carriers and on the system range. Similarly, the practical implementation of the different circuits of a transponder or a terminal according to the present invention is within the abilities of those skilled in the art based on the functional indications given hereabove. Further, the distance detection between the transponder and the terminal may be performed by other means, for example, by using the terminal as described, for example, in WO-A-97/34250. However, the preferred embodiment of the present invention has the advantage of not using the terminal, be it for the distance determination or for the detuning.

The present invention is applicable to, among other areas, contactless chip cards (for example, identification cards for access control, electronic purse cards, cards for storing information about the card holder, consumer fidelity cards, toll television cards, etc.) and read or read/write systems for these cards (for example, access control terminals or porticoes, automatic dispensers, computer terminals, telephone terminals, televisions or satellite decoders, etc.).

Such alterations, modifications, and improvements are intended to be part of this disclosure, and are intended to be within the spirit and the scope of the present invention.

Accordingly, the foregoing description is by way of example only and is not intended to be limiting. The present invention is limited only as defined in the following claims and the equivalents thereto.

What is claimed is:

1. An electromagnetic transponder including:
   an oscillating circuit upstream of a rectifying means adapted to provide a D.C. supply voltage to an electronic circuit including means for transmitting digitally-coded information, and
   means for detuning said oscillating circuit with respect to a determined frequency when the transponder has to transmit information while the transponder is very close to a read/write terminal, the rate of transmission of said information in the detuned configuration being higher than the data transmission rate in a tuned configuration of the oscillating circuit.

2. The transponder of claim 1, wherein the determined frequency corresponds to the frequency of a carrier for remotely supplying the transponder, coming from said terminal.

3. The transponder of claim 1, wherein said means for detuning the oscillating circuit include a switched capacitor, in parallel with an inductive element of the circuit, the rectifying means being formed of a one-way conduction element.

4. The transponder of claim 1, wherein said means for detuning the oscillating circuit include two capacitors, respectively associated with each end terminal of an inductive element of the oscillating circuit, each capacitor being associated in series with a switching means, a reference terminal of which is connected to a reference supply potential of the electronic circuit, downstream the rectifying means.

5. The transponder of claim 1, wherein said means for detuning the oscillating circuit are controllable between two positions to enable a selection between an operation of the transponder tuned on the determined frequency, or detuned from this frequency.

6. The transponder of claim 1, wherein said means for detuning the transponder are also used to detect the distance separating the transponder from a read/write terminal.

7. The transponder of claim 1, further including two resistive modulation means, in parallel with a capacitor for smoothing the rectified voltage provided by the rectifying means, each modulation means being dedicated to one of the tuned or detuned operating modes of the transponder.

8. A system of wireless and contactless data transmission between a terminal of generation of an electromagnetic field and at least one transponder having no independent supply means, wherein the transponder is that of claim 1.

9. The system of claim 8, wherein the data transmission rate from the transponder to the terminal is different according to whether the oscillating circuit of the transponder is or is not tuned to the determined frequency.

10. The system of claim 8, wherein the data transmission rate from the terminal to the transponder is different according to whether the oscillating circuit of the transponder is or is not tuned to the determined frequency.

11. A transponder for use with a base station, wherein the transponder receives base station signals from the base station and transmits information to the base station, comprising:
    a resonant circuit that receives base station signals;
    at least one first circuit that detunes the resonant circuit; and
    at least one second circuit that alters a characteristic of the resonant circuit to transmit information;

wherein a rate of transmission of information is higher when the at least one first circuit detunes the resonant circuit than a rate of transmission of information when the at least one first circuit :does not detune the resonant circuit.

12. The transponder of claim 11 further comprising an electronic block that controls the at least one first circuit and at least one second circuit.

13. The transponder of claim 12 wherein the electronic block controls the at least one first circuit to detune the resonant circuit when the transponder is close to the base station.

14. The transponder of claim 12, wherein the electronic block controls the at least one second circuit to transmit information.

15. The transponder of claim 11, wherein the at least one first circuit comprises a capacitive element in series with a switch.

16. The transponder of claim 11, wherein the at least one second circuit comprises a resistive element in series with a switch.

17. The transponder of claim 11, further comprising at least one third circuit that rectifies base station signals.

18. A method for transmitting data from a transponder to a base station, wherein the transponder has an oscillating circuit, comprising:

detuning the oscillating circuit with respect to a determined frequency when the transponder is close to the base station; and transmitting data from the transponder to the base station, wherein a rate of transmission of the data while the oscillating circuit is detuned is greater than a rate of transmission of data while the oscillating circuit is tuned.

* * * * *